C. H. WILSON.
Apparatus for Neutralizing the Effect of Induced Electrical Currents.
No. 201,374.   Patented March 19, 1878.
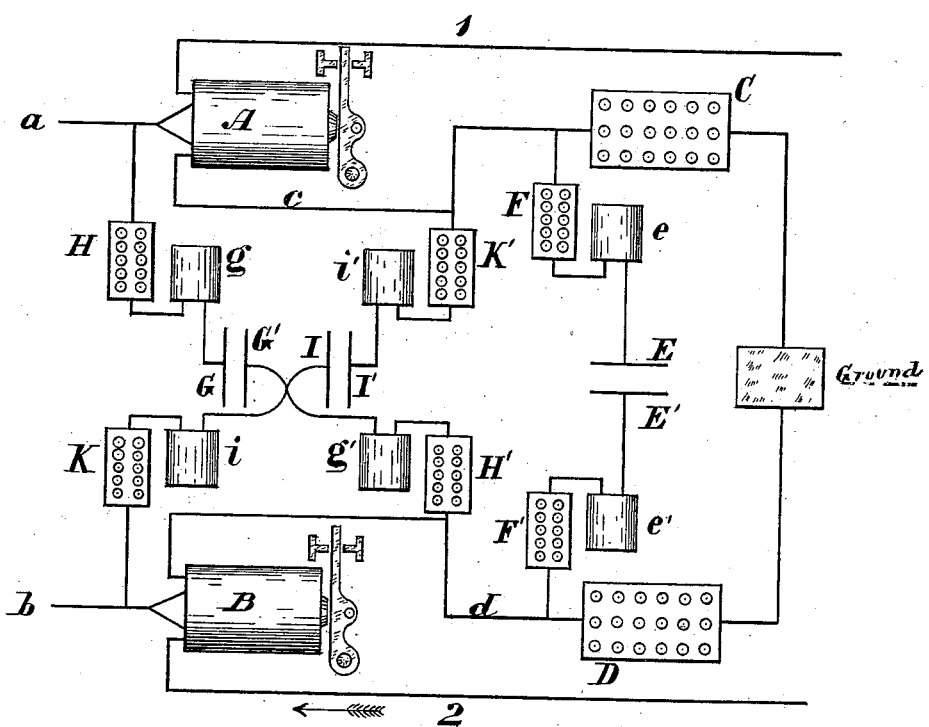
Witnesses
Inventor
Charles H. Wilson
By Coburn & Thacher
Attorneys

UNITED STATES PATENT OFFICE.

CHARLES H. WILSON, OF CHICAGO, ILLINOIS.

IMPROVEMENT IN APPARATUS FOR NEUTRALIZING THE EFFECTS OF INDUCED ELECTRICAL CURRENTS.

Specification forming part of Letters Patent No. 201,374, dated March 19, 1878; application filed January 15, 1878.

*To all whom it may concern:*

Be it known that I, CHARLES H. WILSON, of Chicago, in the county of Cook and State of Illinois, have invented a new and useful Improvement in Apparatus for Neutralizing the Effects of Induced Electrical Currents, which is fully set forth in the following specification, reference being had to the accompanying drawing, which is a plan representation of my improvement arranged in connection with the transmitting and receiving apparatus belonging to two line-wires.

When two or more telegraph-wires are stretched along parallel to each other, and with little space between them, as is now generally the case under the plan of supporting several wires upon the same line of poles, great interference is occasioned by reason of induced currents of electricity, the disturbing effects of which are well known to telegraph-operators.

The object of my invention is to completely neutralize the effects of these induced currents, so that the armatures of the relays connected with different lines will never be affected thereby to interfere with the successful transmission of messages over any one or more of the wires.

The invention consists in a peculiar combination of condensers with the artificial circuits of two or more lines, whereby the effects of induced electrical currents are completely neutralized, as will be hereinafter more fully set forth.

In the drawings, A and B represent two differentially-wound relays, which are respectively in the two telegraph-lines represented by the lines 1 and 2, the transmitter-wires being represented by $a$ and $b$, respectively, and as in the differential duplex system. Two rheostats, C and D, form, in combination with the wires $c$ and $d$, the respective artificial lines or derived circuits, the arrangement and operation of which it is not necessary to describe here, as they are well known.

Condenser-plates E E' are arranged between the two artificial circuits, as shown in the drawing, and on each side of them are resistance and retardation coils F F' and $e$ $e'$, respectively, which are used to adjust the discharge, so that the quantity and time of discharge of the condenser will equal that of the lines 1 and 2. The rheostats or resistance-coils F F' are arranged between the retardation-coils and the wires $c$ $d$, respectively, of the artificial circuits, as shown in the drawing.

When the induced current is equal in both lines 1 and 2, the apparatus above described is sufficient to effect the desired result. The action that takes place is as follows: Suppose a positive current is sent in to line 1 from $a$; before entering the relay A it will divide, part going to line, and part going to earth through the rheostat C. When the line-current reaches that portion of the wire which runs in proximity to 2, there will be a momentary current generated in 2, which will be found to flow in the direction shown by the arrow, and will therefrom enter the relay B; but when the positive current is sent to line, as above described, the condenser-plate E directly becomes charged positively, and the particles of matter on the opposite plate become polarized, the negative being attracted by the positive on the first plate, and the positive repelled, which discharges to earth by two routes, partly through the rheostat D, and partly through the relay B.

The time of this discharge, as well as the quantity, must be made as nearly equal to that of the line as possible. This is effected by means of the resistance and retardation coils F F' and $e$ $e'$, which are adjusted as occasion requires.

The positive current which discharges from the condenser through the relay, and the induced current flowing in from line 2, will, of course, pass around the core of the relay in opposite directions, and consequently will neutralize the effect of each other, so that the armature of the relay will not be in the least disturbed. The two currents pass to earth *via* the transmitter-wire $b$, as will be readily understood.

If the conditions be reversed and a current sent to line 2, the operation will, of course, be reversed, though similar in nature, and producing a like result in relay A instead of relay B, as above described.

Under the condition named, that the quantity of induced current is the same on each line, if the current is sent to both at the same time, it is well known that no interference is experienced from induction, the effect of the current on one line being balanced by the effect of its current upon the other, the action being, of course, the same in the condensers.

In practice, however, the quantity of induced current frequently varies upon two lines; and, in fact, the relative quantity may be changed by substituting wires of different diameters for 1 or 2, or from some other cause.

It becomes necessary, therefore, to provide some means for neutralizing the effect of the unequal discharge.

In order to make the two artificial currents act upon each other in the same ratio as the action of one line upon the other, I introduce additional condensers, arranged diagonally, so that their induced currents in one direction act only upon the respective relays.

In the drawing, the plates G G' represent one of the condensers thus arranged, the plate G being connected to the wire $a$, and the plate G' to the wire $d$ of the artificial circuit belonging to relay B. Between these condenser-plates and the wires to which they are respectively connected are resistance and retardation coils H H' and $g$ $g'$, respectively, and similar to those heretofore described in connection with the condenser-plates E E'.

It is evident from the arrangement described that the discharge from this condenser will affect only the relay B. Condenser-plates I I', similarly arranged, are connected in a similar way with the wire $b$ and the wire $c$ of the artificial circuit belonging to the relay A, and resistance and retardation coils K K' and $i$ $i'$ are arranged between the condenser-plates and their respective connections in like manner as described above. It will also be evident that the discharge from this condenser will affect the relay A only.

Suppose, now, the quantity of induced current on line 2 is greater than that on line 1; then the condenser E E' must be adjusted practically so as to "balance" the lesser of the two currents, 2 to 1. When the current is sent to line on 1 there will be an induced current on 2 somewhat greater than the discharge from the condenser E E'; but at the same time the current is sent to line from $a$, the condenser-plate G becomes charged positively, and, as already described above, a discharge will take place from the plate G', which, at $d$, is added to the discharge from the condenser-plate E', and enters the relay B, as heretofore described.

Now, the resistance and retardation coils H H' and $g$ $g'$, and the condenser-plates G G', should be adjusted to balance the difference between the current on 1 and that on 2, when it is evident that the entire effect of 1 upon 2, producing an induced current, will be neutralized in the relay B.

Now, if the current is sent out at $b$, the condenser G G' evidently will not affect the relay A, as the discharge will flow to earth on the wire $a$. If the conditions be reversed, the condenser I I' must be substituted for G G', arranged as described above, and operates upon the relay A in precisely the same manner, under the conditions now supposed, as the condensers G G' upon the relay B under the former conditions.

In practice, it may be found desirable to use all three condensers at the same time. For instance, if the quantity of induced current on line 2 be greater than on line 1, and on the other hand the time of discharge longer on 1 than on 2, perhaps the time of discharge on both cannot be fully balanced by retardation in the discharge from condenser E E'. A part of the necessary retardation may then be made in the discharge from the condenser I I', while the condenser G G' will act as already described.

This arrangement of devices, operating as described, is applicable to each end of the line, or, in general, to the transmitting and receiving apparatus wherever located, and in any system employing derived circuits.

In the description above I have referred only to the influence of induced currents at the home station.

I am aware that the effect is also felt at the other end of the line—that is, at the receiving-station; but this improvement, as herein set forth and described, is not adapted to the neutralization of the effects of such induced current at the receiving end of the line, and an improvement for that purpose will constitute the subject-matter of a separate application for Letters Patent.

In the description above I have spoken of condenser-plates only; but under certain conditions induction-coils of peculiar construction may be used in place of the condensers. This adaptation of the coils to be used in place of the condensers does not, however, constitute a part of my present improvement, and is not included in this patent.

I do not limit myself to the precise arrangement of devices herein described and shown, for it is possible that they may be combined under a somewhat different arrangement without materially affecting the result.

Having thus described my invention, I claim as new and desire to secure by Letters Patent—

1. The method herein described of neutralizing the effects of induced electrical currents, the same consisting in interposing condensers between the derived circuits, and making their discharge equivalent to that of the line by means of resistance and retardation coils, substantially as described.

2. The condenser E E', connected with the derived circuits of two or more telegraph-lines, in combination with the retardation-coils $e$ $e'$, substantially as described.

3. The condenser E E', connected with the derived circuits of two or more telegraph-lines, in combination with the rheostats F F' and retardation-coils $e$ $e'$, substantially as described.

4. A condenser arranged between two telegraph-lines, and connected therewith, so that the effect of its discharge will be felt on only one of the lines, substantially as described.

5. A condenser arranged between the relays of two different telegraph-wires, and connected to the derived circuit of one and the transmitting-wire of the other relay, substantially as described.

6. The main condenser E E', connected with the derived circuits, as set forth, in combination with a supplementary condenser connected with the lines, so that its discharge will be felt in but one of the relays, and resistance and retardation devices connected with each, substantially as described.

7. The condenser E E', connected with the derived circuit, in combination with the condensers G G' and I I', connected, respectively, with one of the derived circuits and one of the transmitter-wires, and resistance and retardation devices connected with each condenser, substantially as described.

CHARLES H. WILSON.

Witnesses:
    JNO. C. MACGREGOR,
    W. C. CORLIES.